June 3, 1941.    R. A. ROWLEY    2,244,262
RECORD POSTING MACHINE
Filed April 17, 1937    9 Sheets-Sheet 1

INVENTOR
Russell A. Rowley
BY
W. M. Wilson
ATTORNEY

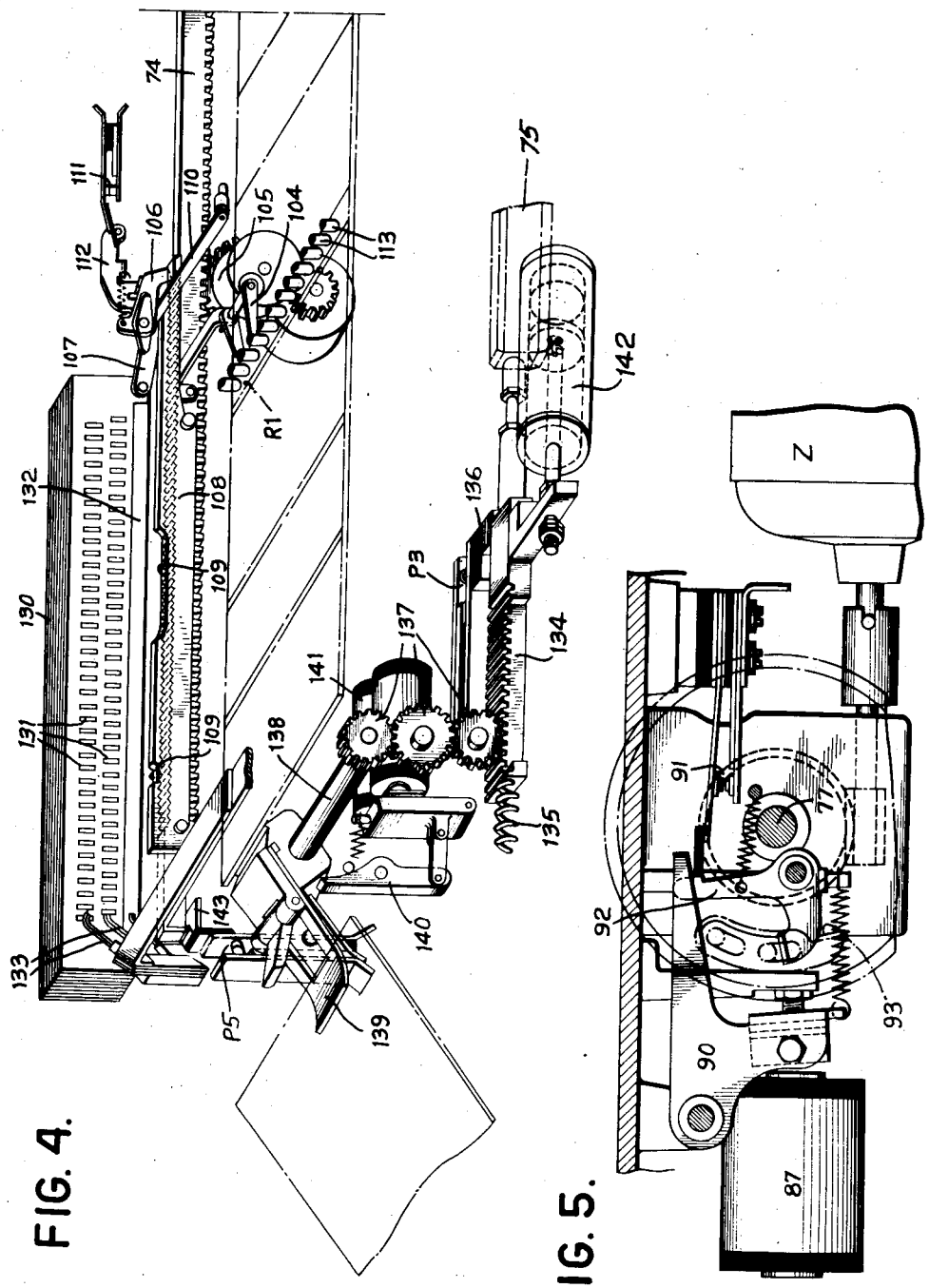

June 3, 1941.  R. A. ROWLEY  2,244,262
RECORD POSTING MACHINE
Filed April 17, 1937  9 Sheets-Sheet 5

INVENTOR
Russell A. Rowley
BY
ATTORNEY

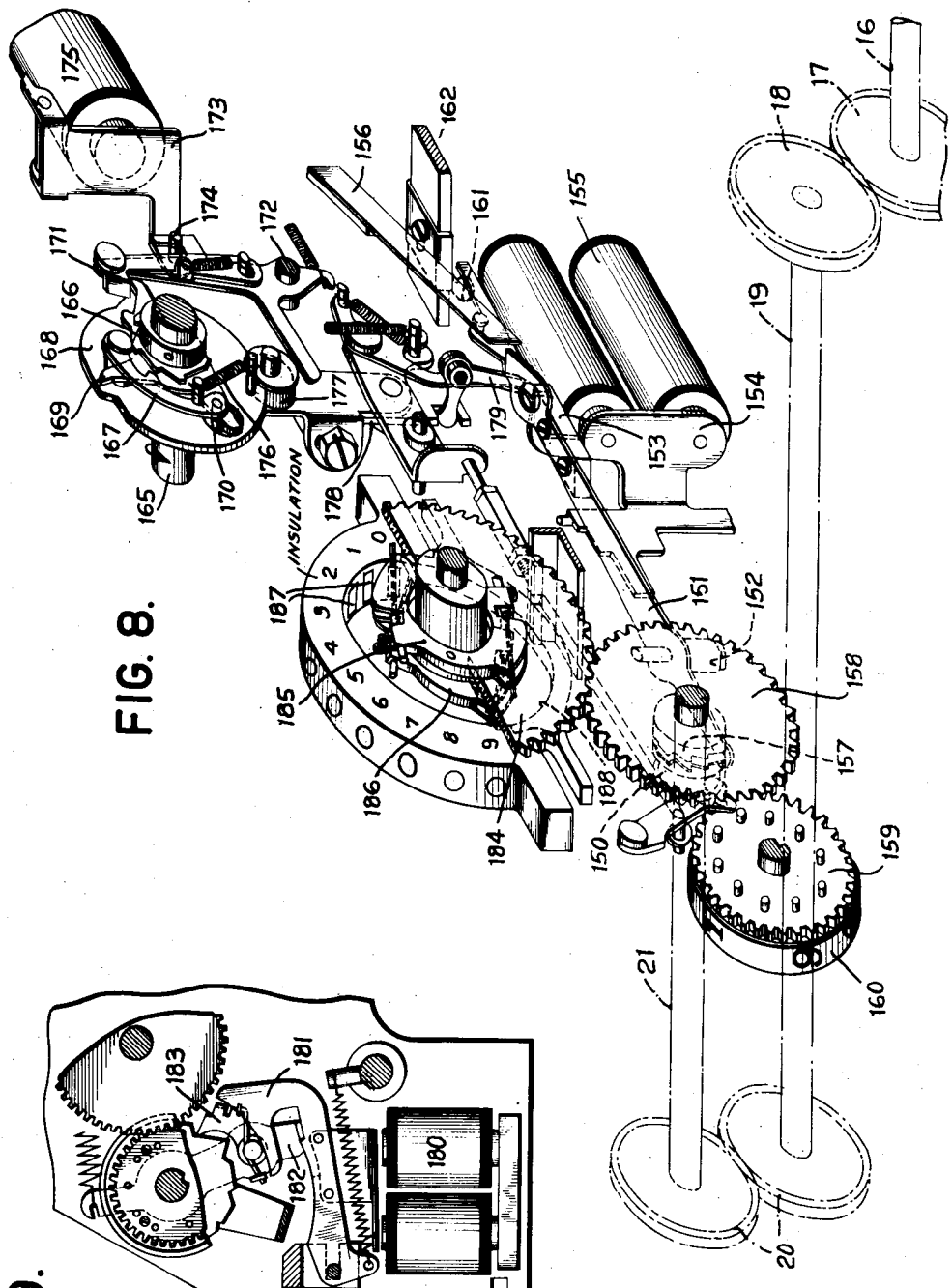

June 3, 1941.  R. A. ROWLEY  2,244,262
RECORD POSTING MACHINE
Filed April 17, 1937  9 Sheets-Sheet 9

INVENTOR
Russell A. Rowley
BY
ATTORNEY

Patented June 3, 1941

2,244,262

UNITED STATES PATENT OFFICE 2,244,262

RECORD POSTING MACHINE

Russell A. Rowley, Endicott, N. Y., assignor to International Business Machines Corporation, New York, N. Y., a corporation of New York Application April 17, 1937, Serial No. 137,411

5 Claims. (Cl. 235—61.8)

This invention relates to automatic posting machines and has to do with that class of posting machines which operate upon, or are controlled by, record cards bearing index points or characters which represent definite items of information.

The machine is designed to act upon groups of cards, each relating to an account and each comprising one or more "payment" cards containing perforations representing amounts paid as premiums, interest, or principal due on a loan or the like, and one or more "due" cards containing perforations representing sums of money due at certain periods. The "payment" cards are identified by a special designation to distinguish them as such.

The cards are fed through the machine with the "payment" cards leading and a total is first obtained of the amount paid. As each "due" card is subsequently fed, the due installment represented by the same is deducted from the total amount paid and if the installment represented is less than the amount paid, a special designation or posting is made on the "due" card to represent that such installment has been paid. When the amount on a "due" card is greater than the diminished total remaining after one or more "due" amounts have been subtracted, the posting operation is suppressed and the difference between the total and the due amount is entered on the card in the form of perforations. Thus, if a "due" card calls for a $1,500 premium and the amount paid and still unposted is $500, the "due" card is punched with the amount of $1,000 which is still due. Also, for example, a group may comprise two cards, a "payment" card of $600 and a "due" card of $1,000. The machine will determine that only a part of the amount due has been paid and will automatically punch $400 back in the "due" card to indicate the balance still due.

The machine includes a card feeding and sensing mechanism which handles the cards one by one and delivers them singly to a punching mechanism. A single accumulator is provided which is controlled by the sensing devices to receive the "amount" information from the record cards. The amount on each "payment" card is entered into the accumulator in the form of a complement and the amounts on the "due" cards are entered as true numbers. The effect of this is to cause the subtraction of the "due" amounts from the amount paid. This subtracting operation takes place for each successive "due" card until the initial complementary entry changes to a true number. When this occurs, the "due" card, whose amount caused the change, will be automatically punched with the true value standing on the accumulator.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

Figure 4A:
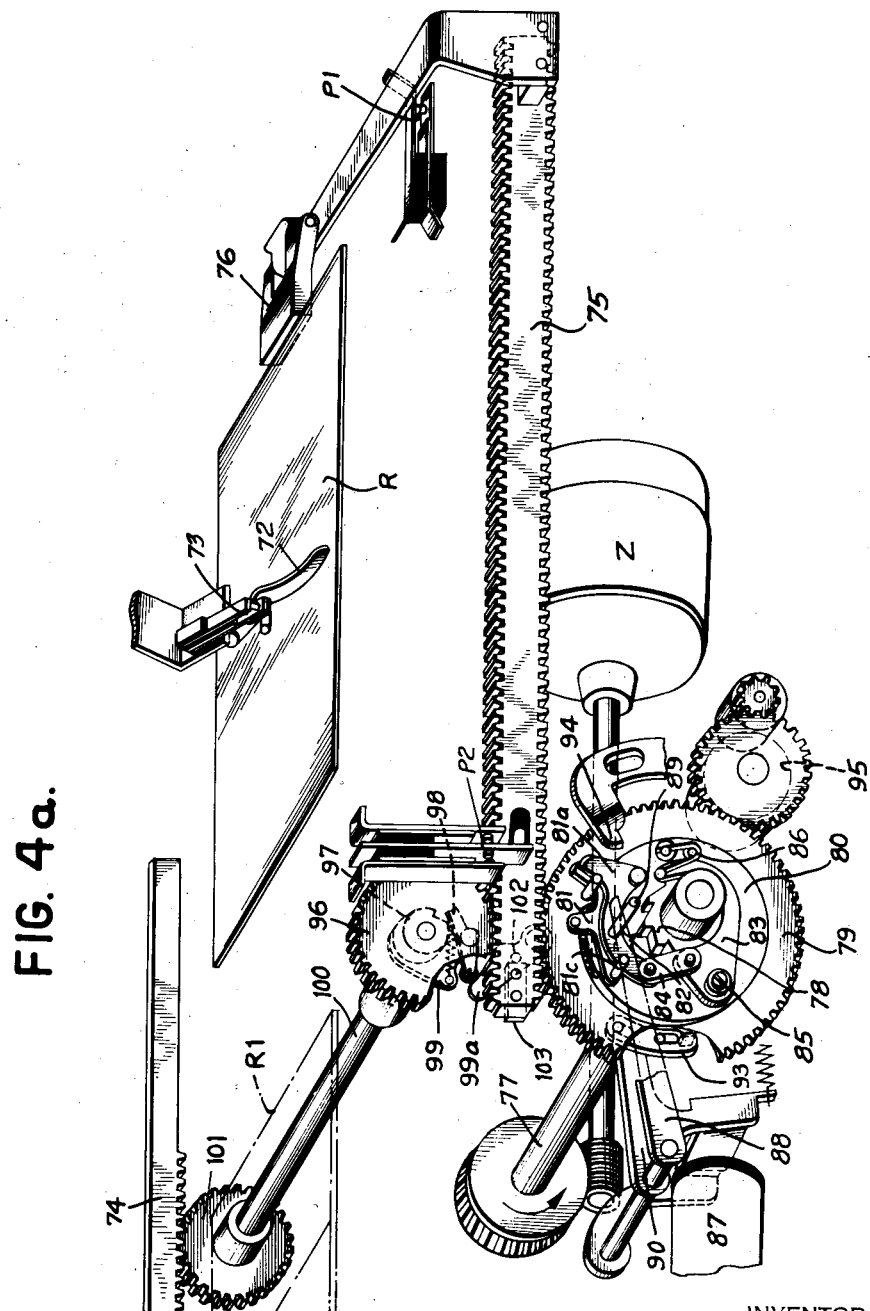

Figs. 4 and 4a, taken together, show an isometric skeleton view of the punching section of the machine.

Fig. 5 is a sectional detail of certain parts in the punching section of the machine.

Figure 6:
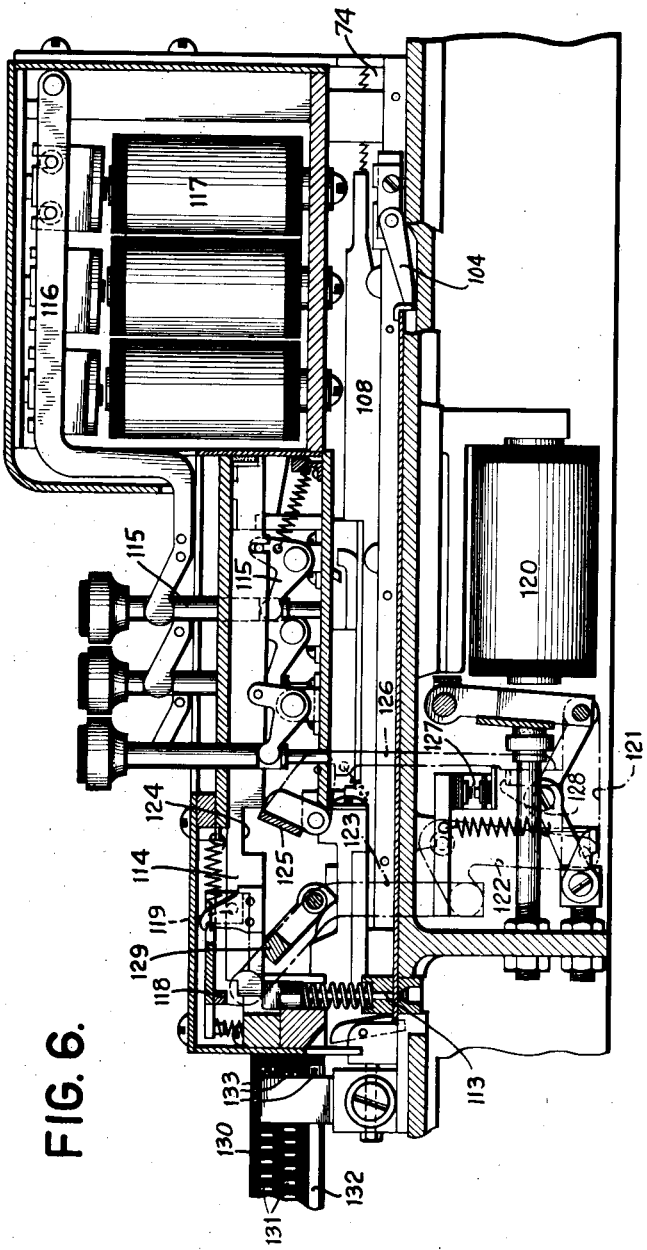

Fig. 6 is a sectional view of the punch selecting and operating mechanism.

Figure 7:
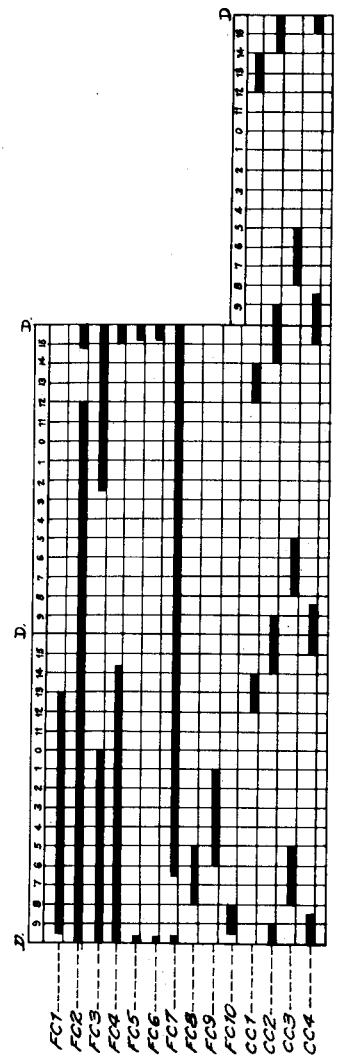

Fig. 7 is a timing diagram of the electrical contact devices of the machine.

Fig. 8 is an isometric view of one order of the accumulating mechanism, showing the adding and subtracting control devices therefor.

Fig. 9 is a showing of the "elusive one" entering device which is associated with the lowest denominational order of the accumulator.

Figure 10:
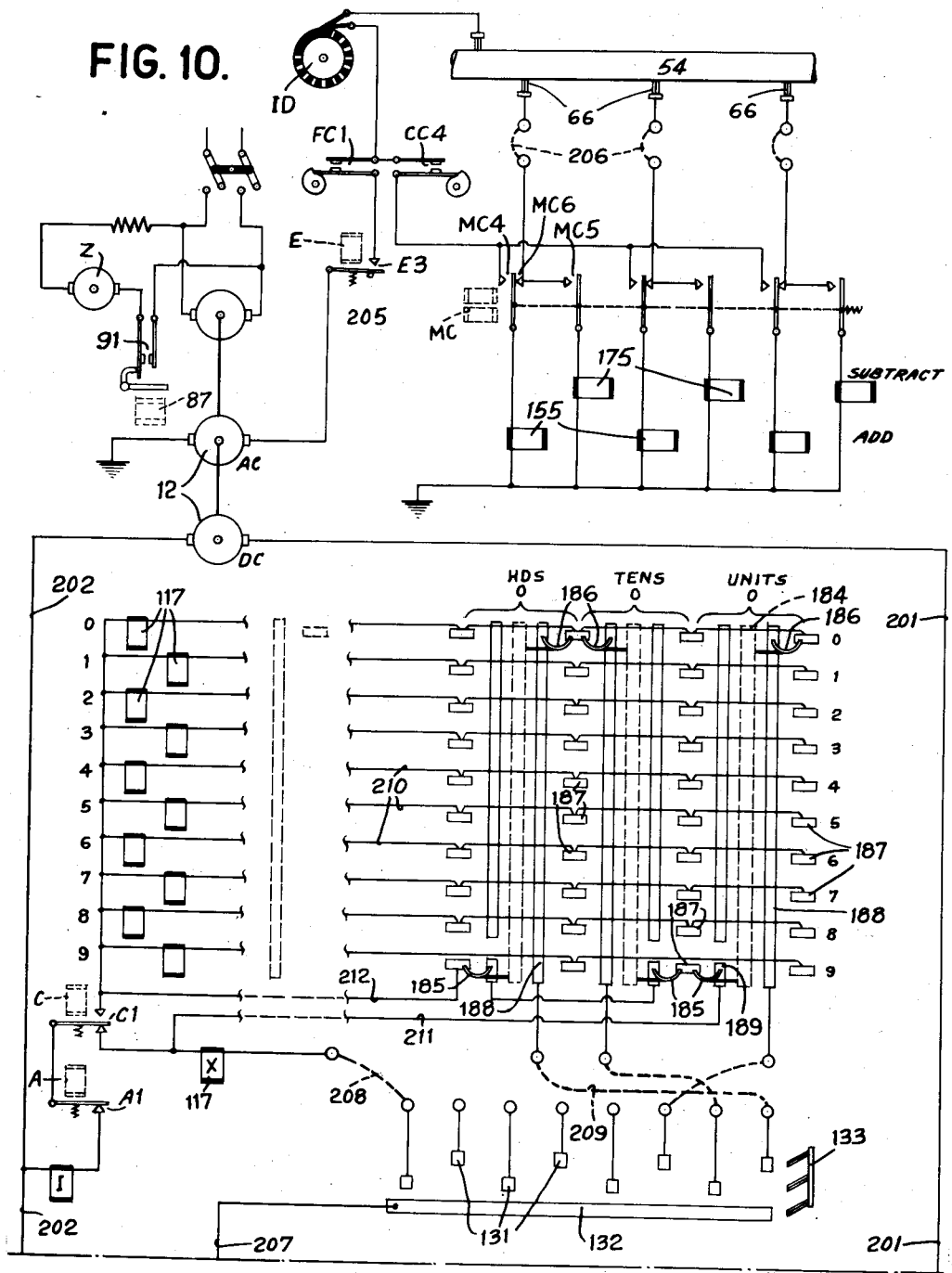
Figure 10A:
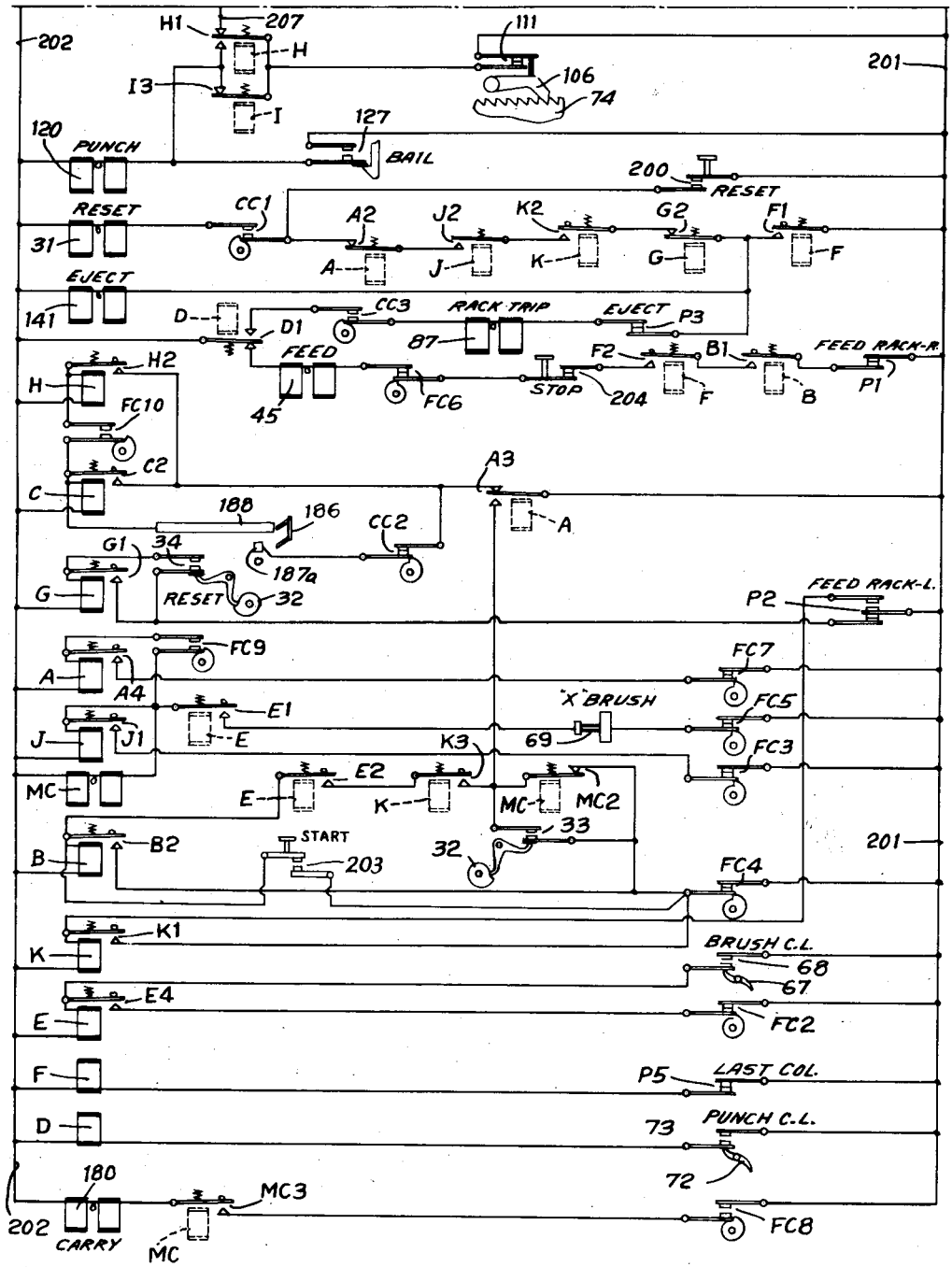

Figs. 10 and 10a, placed one below the other in the order named, constitute a wiring diagram of the electric circuits of the machine.

Figure 11:
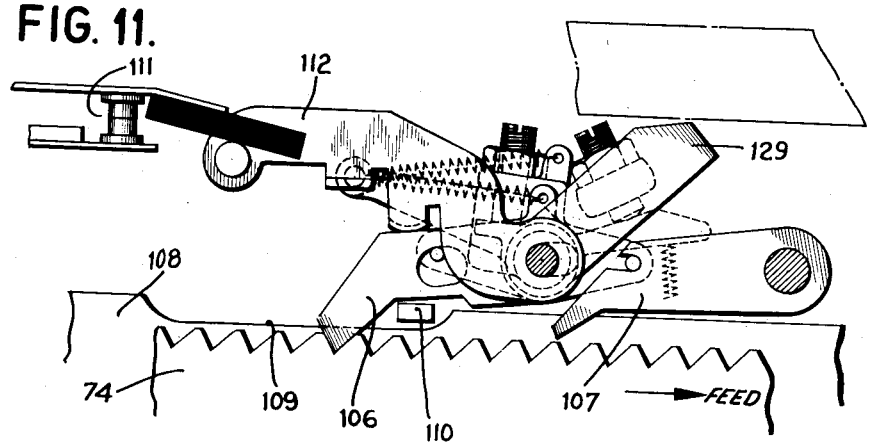
Figure 12:
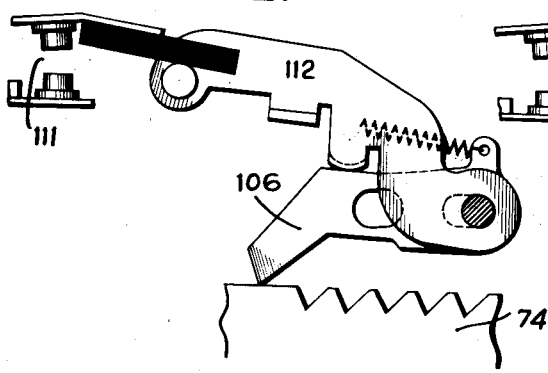
Figure 13:
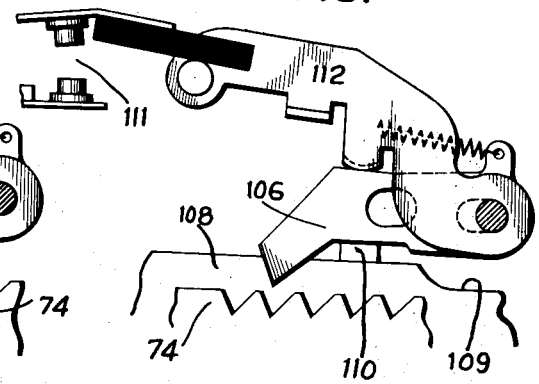

Figs. 11, 12, and 13 show the punch carriage escapement mechanism in various positions of operation.

Machine drive

Figure 1:
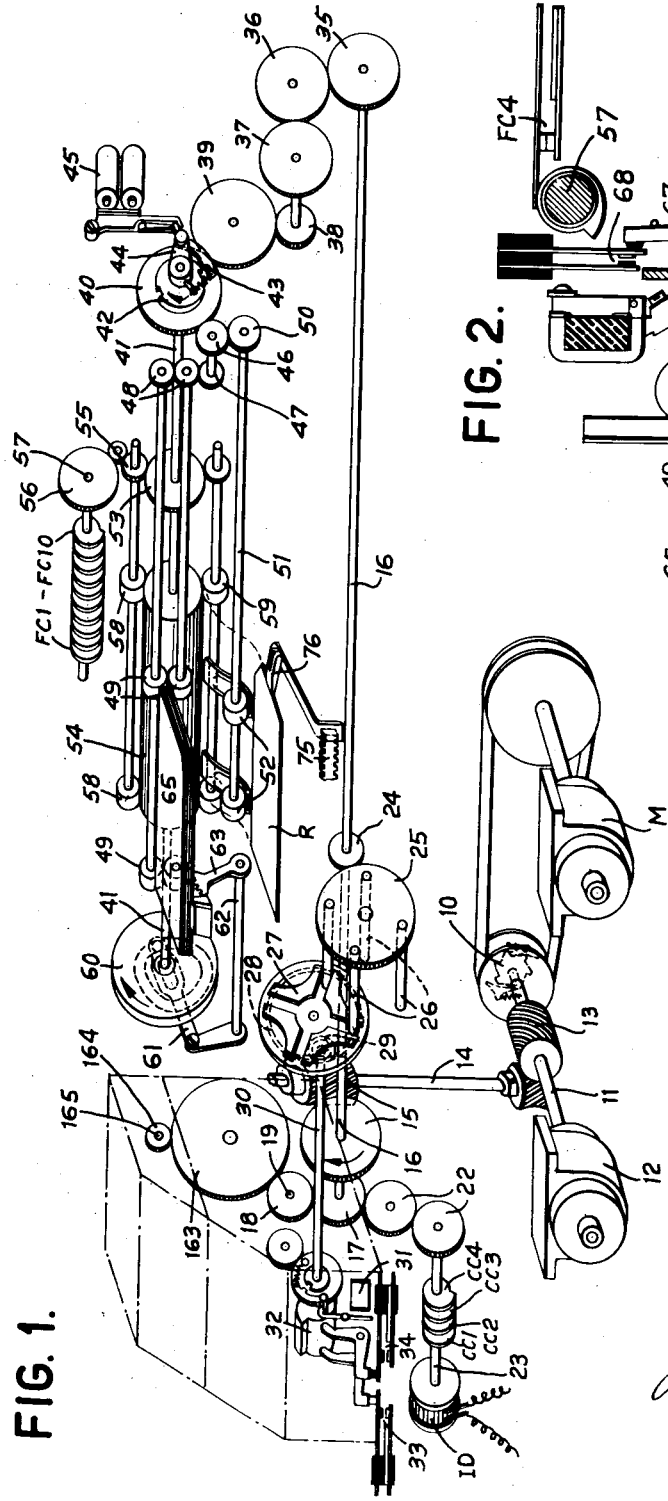
Fig. 1 shows a diagrammatic view of the various units of the machine and the train of mechanism for driving them.

The machine is driven by a constantly running motor M (Fig. 1). This motor, through a belt and pulley drive and usual one-way ratchet drive 10, drives a shaft 11, which shaft drives an A. C.—D. C. generator 12. The A. C. end of this generator is adapted to produce the impulses for actuating the accumulator entering magnets. Shaft 11, through the worm gear 13, drives a vertical shaft 14 which, through gear 15, drives the horizontal shaft 16 which is called the accumulator drive shaft. Gear 17 on shaft 16 drives gear 18 on shaft 19 which extends into the accumulator (see also Fig. 8). Shaft 19, through gear 20, drives the clutch shaft 21 of the accumulator, which will be further described hereinafter. Driven from gear 17, through gears 22, is a shaft 23 carrying cams CC1—CC4 which rotate constantly and also impulse distributing commutator ID. Accumulator drive shaft 16 is provided with a spur gear 24 driving a gear 25 with a 4:1 driving ratio. Gear 25 has extending from it four Geneva pins 26 cooperating with the other or cross element of the Geneva drive, generally designated 27. Secured to element 27 is an internal gear 28, which gear has cooperating with it a spur gear 29 mounted on the end of the reset shaft 30. The reset shaft 30 is provided with an electromagnetic one-revolution clutch for coupling the shaft to the accumulating mechanism to reset the same. The one-revolution clutch is operated by the magnet 31, which also causes a revolution of a contact operating cam 32 which controls pairs of contacts 33 and 34.

Card feeding mechanism

Referring to Fig. 1, the accumulator drive shaft 16 at its extreme right hand end is provided with a gear 35 which, through an idler gear 36, drives a gear 37 which, through its shaft, drives a gear 38, which gear 38, in turn, drives a gear 39. Gear 39, in turn, drives a gear 40 revolvably mounted on shaft 41. Gear 40 has fixed to it one element 42 of a one-revolution clutch, the complemental part of which comprises a pawl 43 carried by an arm 44 secured to shaft 41. The one-revolution clutch is of the customary type used in tabulating machines and this one-revolution clutch is engaged by the energization of a clutch magnet 45. With the one-revolution clutch engaged, it will be understood that the shaft 41 will rotate in unison with gear 40, and with the one-revolution clutch disengaged, 40 will continue its rotation and shaft 41 will remain stationary. The gear ratio between shafts 41 and 16 is such that with the clutch engaged shaft 41 makes one complete revolution during two complete revolutions of shaft 16. This card feeding mechanism is well known and is of the type disclosed in the Patent No. 2,045,437, granted June 23, 1936, to George F. Daly, so that the description thereof is but briefly given herein.

Gear 40 also drives an intermediate gear 46 which, in turn, is fixed to the gear 47, which gear 47 drives a train of gears 48 which, in turn, drive the card feed rolls 49 of the machine. The feed rolls 49 are constantly rotating feed rolls, the same rotating at all times when gear 40 is rotating and at all times when the main accumulator drive shaft 16 is rotating. Also in train with gear 46 is a gear 50, which gear constantly drives a drag roll shaft 51 which has fixed thereto a pair of drag rolls 52.

The drive of the parts from the intermediate element of the one-revolution clutch will now be described. The shaft 41 has secured to it a gear 53 and also secured to the shaft 41 is a card transfer and contact cylinder 54. As shown, the one-revolution clutch element 42 is provided with two notches and the arrangement of this clutch is such that whenever the pawl 43 is engaged, the element 44 of the clutch will make one complete rotation. Accordingly, whenever the one-revolution clutch is engaged, the card transfer cylinder will make one complete revolution. The one-revolution clutch pawl 43 may be engaged in either of the two notches of the clutch element 42, which relation of the clutch member is provided because one accumulating cycle is required to traverse the card and carry it by the sensing brushes, after the card has been advanced to a position where it is about to pass brushes 66, and another accumulating cycle is required to deliver the card to the punching section of the machine, and since it is desired that the clutch parts be engageable without delay upon the accumulating drive shaft turning through either an odd or even number of revolutions. It may be pointed out that in first starting the machine two accumulating cycles are required to advance the first card to the brushes 66 and that while the second card is advanced to the brushes, the first card passes the brushes and is deposited in the punching section of the machine.

Figure 2:
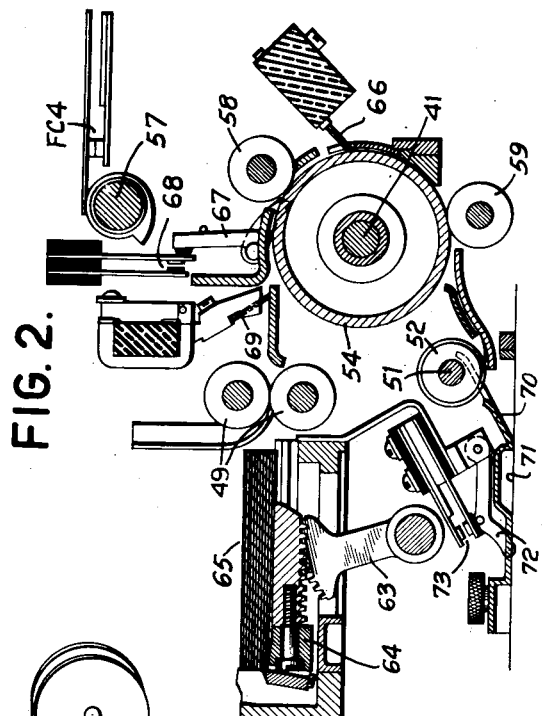
Fig. 2 is a vertical sectional view taken through the card handling and reading section of the machine.

Gear 53 drives a gear 55 which, through an idler, drives a gear 56 fixed to cam contact drive shaft 57. On shaft 57 are secured a number of cams for actuating contact devices which are known as the FC group of cam contacts of the machine. The arrangement of these cams is such that they make one revolution per card cycle or a half revolution during an accumulating cycle. Fixed to the shaft of gear 55 are card feed rolls 58 (see also Fig. 2) which are spring-pressed into contact with the card transfer and contact cylinder 54. Similar spring-pressed card feed rolls 59 also cooperate with the cylinder 54 and these rolls are driven, as indicated, from the gear 53.

Card picker drive

Shaft 41 has secured on one end thereof a box cam 60 which has a cam follower 61 cooperating therewith. The cam follower connects to a rock shaft 62 to which is secured a gear sector 63 (see Fig. 2). The gear sector is in engagement with picker block 64. By the engagement of the one-revolution clutch, the picker is called into action and the advance of the picker withdraws a single card from the magazine 65 and advances this card into the bite of the rolls 49. The rolls 49, in turn, forward the card to the card transfer roll 54. A curved card guide is provided around the transfer cylinder and the advancing card is carried around by the forward rotation of the transfer cylinder and by the rotation of rolls 58 so as to be traversed under the main card sensing brushes, generally designated 66. Also in cooperation with the card is a pivoted card lever 67 which lever 67 has a tail portion arranged to bear against the upper surface of the card. With the card in position under this tail of the card lever, contacts 68 will be closed. Intermediate rolls 49 and the transfer cylinder 54 there is provided an advance or "X" brush sensing position, in which position a contact brush designated 69 is provided. This brush is positioned to traverse any desired column of the record card.

After the card has been sensed by the main sensing brushes 66, it is advanced between guiding members by the cooperation of the feed rolls 59 with the cylinder 54. From there it is advanced by drag rolls 52 so that the card may be delivered into the tray of the punching section of the machine. The drag rolls 52 deliver the card under the guiding member 70 and after the card has been freed from the drag rolls it is flipped down into the tray of the punching section of the machine. The location of this tray is generally designated at 71 in Fig. 2 and the position of the card in this tray is indicated at R in Fig. 1. A card lever 72 is also provided adjacent to the tray for closing card lever contacts 73 when the card is lodged in the tray of the punching section of the machine.

Punch card feeding mechanism

The punching mechanism is of the type in which the card columns are perforated in succession and includes two card feed racks 74 and 75 (Figs. 4 and 4a). Rack 75 carries an arm provided with a pusher finger 76. The drive is by a separate motor Z which, through worm and wheel connection shown, drives shaft 77 which has a ratchet-shaped clutch element 78 secured thereto. Beside element 78 is a gear 79 which meshes with the lower teeth of rack 75. Secured to 79 is a disk 80. Pivoted on 80 is a member 81 provided with a ratchet-shaped clutch tooth 82. Beside 81 is another member 81a which lacks the clutch tooth. On 81 is a pin 81c overlying an arcuate surface of 81a. The free end of 81a is connected to a toggle member 83 by a link 84. 83 is pivoted on 80 at 85. The opposite end of 83 remote from its pivot 85 is connected to a spring element 86 which spring tends to hold the clutch tooth 82 out of engagement with the clutch teeth of element 78 and allows it to engage when 83 is shifted.

For the purpose of effecting a clutching action, a punch feed clutch magnet 87 is provided. This magnet, when energized, attracts its armature and causes an arm 88 to engage the pin 89, depressing 81a and allowing 81 to descend so that the tooth 82 engages with the ratchet 78. Upon such engagement, the gear 79 will be driven in counterclockwise direction substantially a single revolution, shifting rack 75 to the left. This action will, through the card pusher 76, move the card from the R position to the position designated R1. Also, when magnet 87 is energized, an arm 90 on the armature will close contacts 91 (see Fig. 5). Such contacts are latched closed by a latch 92. The latch is tripped to allow the contacts to reopen by a knock-off 93 carried on the back of gear 79 (see Fig. 4a). At the termination of the counterclockwise movement of gear 79, the tails of parts 81 and 81a will strike a projection 94 on a fixed plate to effect the disengagement of the tooth 82 from the ratchet 78. This action also restores the toggle parts to normal position.

The above driving action has wound up a spring in barrel 95. Upon disengagement of the one tooth arm clutch 82, rack 75 returns to the right under the influence of the spring in barrel 95.

The driving train to the second card carriage rack 74 is as follows: Rack 75 has its upper teeth inter-meshed with gear 96 which has secured to it a member 97 having a single notch or tooth disposed in the plane of a pawl 98 which is pivoted on part 99 fixed to the shaft 100. 100 on its opposite end carries a gear 101 which meshes with the left hand card carriage rack 74. Suitable mechanism controls the coaction of pawl 98 with member 97 so that with the rack 75 in extreme right hand position, pawl 98 will be disengaged from the clutch element 97. Such disengagement is effected by the rocking of 98 in a clockwise direction by the coaction of the pin 102 with a block 103 carried on rack 75. Upon initial movement of 75 to the left, the block 103 will clear the pivoted camming element 99a, allowing a slight counterclockwise motion of it so that 98, under spring action, may rock and engage the tooth of member 97. Thereafter, drive will come from 75 through gear 96, through 97, to pawl 98, to 99, to shaft 100, so that a clockwise rotational movement will be imparted to 100. This action will, through gear 101, traverse rack 74 to the right.

The card carriage rack 74 will thus be shifted to its extreme right hand position, permitting the card pusher 104 to first ride over the surface of the card and ultimately engage back of the trailing edge of the card at the R1 position. Rack 74 has associated with it a spring drive comprising the usual spring barrel 105. This spring is wound up by the traverse of 74 toward the right and is adapted to cause a movement of 74 to the left under spring action. The rack 74 also has associated with it an escapement mechanism including pawls 106 and 107 (see Fig. 11).

Escapement mechanism

Removably secured to the card carriage rack 74 is a so-called skip bar 108 provided with a notched portion 109 which permits skip lifter lever 110 to descend into the notch. When the skip lifter lever descends into the notch, it allows the pawl 106 to cooperate with the ratchet teeth of rack 74. With skip lifter lever 110 riding on the top of the skip bar 108, the escapement will be disabled by the lifting of 106 out of the teeth in rack 74 so that the card carriage rack 74 can advance uninterruptedly without stopping at each card column, until the notch 109 is reached. As is well known and as shown in Patent No. 1,772,186, granted August 5, 1930, to F. L. Lee et al. (Fig. 17 thereof) pawl 106 is raised without disturbing the pawl 107. (See also Fig. 11.) Thereafter, there is an intermittent motion of the card carriage to the left under spring action and under escapement control. When the skip lifter lever again rides out of the notch, the card carriage rack 74 again freely advances until another notch 109 occurs. The location of the beginning of the notch in the skip bar determines the position for the beginning of punching. When the escapement pawl 106 is lifted up, the contacts 111 are opened through the action of a lever 112 which has a projection resting on the upper edge of pawl 106. In Fig. 12 are shown the relative positions of the parts when the rack 74 is in the so-called last column position, that is, when the card has been advanced completely through the punching section. In this position, the pawl 106, after the last escapement action, has ridden up on the unserrated edge of the rack and through lever 112 has opened contacts 111. Fig. 13 shows the position of the parts as the high portion of the skip bar 108, acting on skip lifter lever 110, causes opening of contacts 111.

Punching mechanism

The punching mechanism, itself, is shown in Fig. 6 and includes a column of punches 113 by which the card is moved to pass step by step or column by column under control of the above described escapement mechanism. Above each of the punches is an interposer 114 which has pin and slot connection with one arm of a bell crank 115 whose other arm has disk and slot connection with key stem 115. The key stem, in turn, is operatively connected with an armature lever 116 of punch selecting magnet 117. Energization of magnet 117 will cause depression of the key stem 115 and consequent movement of interposer 114 toward the left. The left end of the interposer is notched, as shown, with the notch normally underlying a bar 118 carried by a bail pivoted at 119. With the interposer advanced, its widest portion will lie between the bar 118 and the punch 113 so that, if the bar 118 is depressed at this time, the punch will be forced through the card.

Rocking of the bar 118 is effected by punch magnet 120, which, upon energization, will, through link 121, rock bell crank 122 and draw downwardly on link 123 whose upper end is connected to the bail carrying bar 118. Each interposer 114 is notched as at 124 and a bail 125 extends across the notches, as shown, so that movement of any interposer toward the left will rock the bail 125 and cause elevation of a hooked member 126 which is pivoted on an arm of the bail. The lower end of the member 126 is provided with a hook which engages the lower blade of a pair of contacts 127 to cause closure of the same when the hook is elevated. The contacts, as will be explained, complete the circuit to the magnet 120 whose connecting link 121 is provided with an extension 128 so that, when the magnet is energized, the extension will strike hook 126 and move it out of cooperation with the contacts so that they may thereafter open. Lying beneath the interposers is the escapement bail 129 which is rocked whenever an interposer is depressed to actuate a punch. The bail 129, as shown in Fig. 11, is connected to the pawls 106 and 107 and the action is such that as a punch is operated, the holding pawl 107 is lowered into engagement with the rack to hold the card in position while the stepping pawl 106 is lifted out and slightly advanced in readiness to engage the next succeeding tooth when holding pawl 107 is again lifted out of the rack. In line with the interposers 114 is a so-called "space" interposer which has no notch in its left hand end, so that for each operation of magnet 120, bar 118 through the "space" interposer will rock bail 129.

*Column selector*

Referring to Figs. 4 and 6, there is shown, disposed alongside of card carriage rack 74 and fixed to the frame of the machine, a block or strip of insulating material 130. Disposed in this block are a number of spots 131 of conducting material and alongside of these spots is a common strip of conducting material 132. A suitable bridging or multiple brush assembly 133 is carried by the card carriage rack 74 and as the card carriage rack moves, the bridging brush 133 is displaced and establishes circuit connections from the common strip 132 to one of the spots 131, depending upon the position of the rack. Spots 131 are preferably placed in two rows and inter-staggered as shown.

*Card ejector*

Referring to Fig. 4, after the card has reached the R1 position and has thereafter been punched or traversed past the punches without punching, it ultimately reaches a position at the left hand end of the punching section of the machine, from which point it must be discharged into the discharge hopper. The card eject mechanism is shown in Fig. 4 with the parts shown in the position which they assumed before the machine was started into operation or in the eject position. Upon the first card feeding operation through the punching section of the machine, rack 75 will have moved towards its extreme left position. After reaching the dotted line position shown in Fig. 4, a rack 75 moves further to the left and thrusts a rack 134 to the left, compressing a coil spring 135. Bearing against a shoulder on rack 134 is a contact operating part 136. When rack 134 is thrust to the left, contacts P3, which were previously closed, will open under their own spring action. The displacement of rack 134 to the extreme left position will also, through intermediate gears 137, rock a shaft 138 in a clockwise direction to bring an ejector clip assemblage 139 away from the position shown in Fig. 5 to a position in which the ejector clip can receive a card which has been advanced through the machine.

With the ejector clip assemblage 139 disposed in such card receiving position, the assemblage will be latched in such position by a latch 140 which latch is fully described in British Patent No. 362,529 (see latch 216 of that patent in Fig. 16). The eject clip latch is adapted to be released by an ejector magnet 141. Upon energization of the eject magnet 141, latch 140 is released so that the ejector clip assemblage, which has then grasped a card, springs, under the influence of spring 135, from the card receiving position to the position shown in Fig. 4, in which position the jaws of the ejector are opened so that a card can be discharged therefrom. To prevent too violent ejecting movement of the ejector assemblage, dash pot means are provided for slowing down the ejecting action. Such dash pot is shown at 142 with its piston rod connected to a bracket extending from the rack 134.

*Contact devices in punching section of machine*

In the punching section there are other contact devices as follows:

Contacts P1 (Fig. 4a) are contacts which are closed when rack 75 is in extreme right hand position and ready to receive a card from the card handling and sensing section of the machine.

Contacts P2 (Fig. 4a) are a pair of double contacts which are arranged to shift when rack 75 makes a complete movement to the left.

Contacts P3 (Fig. 4) are a pair of contacts lying adjacent to the escapement rack 134. When rack 134 is thrust to the left, contacts P3 will open under their own spring action and, when the rack is in its right hand position, it will engage a block 136 of insulating material to cause closure of the contacts.

Contacts P5 (Fig. 4) are also provided. Such contacts are operated as follows: An extension 143 on rack 74 is adapted, when the rack has passed beyond the last column position, to cause contacts P5, which were previously open, to close. Such contacts P5 are normally open when rack 74 is in any of the positions to the right of the last column position.

*Accumulator*

The accumulator employed in the machine is of the type shown and described in Patent No. 1,976,617 granted to C. D. Lake et al., October 9, 1934, and the same will accordingly be but briefly described. In Fig. 8, there is shown in isometric one denominational order in which entries may be made additively or subtractively. As explained above, the shafts 19 and 21 are in constant rotation as long as the motor M receives current. Shaft 21 has slidably mounted thereon, but keyed for rotation therewith, a clutch element 150 for each denominational order. The element 150 is provided with a circumferential groove in which fits the end of a lever 151 which is pivoted at 152. The other arm of the lever is provided with a block 153, normally held in position by armature 154 of a magnet 155. A leaf spring 156 bears against the extremity of lever 151 and moves the same upon release of block 153 by armature 154. This movement will bring clutching member 150 into engagement with cooperating teeth 157 integral with the gear 158 loosely mounted on shaft 21. Gear 158, when thus coupled to shaft 21, will rotate a gear 159 which meshes therewith and will displace the accumulator index wheel 160. The rearward extremity of lever 151 is adapted to be engaged by a finger 161 carried on a bar 162 toward the end of the cycle for the purpose of disengaging clutch element 150 from teeth 157 and relatching block 153 on armature 154. The operation of bar 162 is controlled by cam and lever mechanism (not shown).

Briefly summarizing the adding operation, the magnet 155 may be energized at various points in the cycle of the machine depending upon the location of a perforation in a column of a record card analyzed by the sensing brushes 66. This energization may take place in response to a perforation in any of the index point positions from 9 to 1, inclusive. A perforation in the 9 position will trip the clutch element 150 nine steps before finger 161 is operated to declutch it, and a perforation in the 1 position will trip the clutch element 150 one step before it is declutched by finger 161. Each step of clutching engagement corresponds to a tenth of a revolution of the accumulator index wheel 160 so that a 9 hole will move it nine-tenths of a revolution and the 1 hole will move it one-tenth of a revolution. The manner in which circuits through the brushes 66 control the operation of magnet 155 will be set forth in connection with the explanation of the circuit diagram.

Between adjacent denominational orders of the accumulator there is provided the usual carry mechanism which is fully set forth in Patent No. 1,976,617.

*Subtracting mechanism.*—Subtracting is performed in the same manner as is more fully set forth in the patent referred to. In the operation of the accumulator, the entry of the nine complement of a number to be subtracted is effected by initially tripping all the adding magnets 155 as though to add nines in each position and causing the perforation in the record card to declutch the adding mechanism in accordance with the location of the perforation. This will result in the addition of the nine complement of the number. The "elusive one" is added into the units order of the accumulator independently to thereby change the nine complement to a ten complement. For example, if an 8 is to be subtracted in a particular order, the related adding magnet 155 is tripped at the 9 position in the cycle of the machine and the index wheel will commence to rotate. At the next index point position, which is 8, the perforation will, through the mechanism to be presently described, cause declutching of the mechanism after the index wheel 160 has turned through one step with the result that a 1 is added into the index wheel representative of the nine complement of 8.

In Fig. 1, the gear 18, through an idler 163, drives a gear 164 on a shaft 165 so that this shaft is also in constant rotation, the ratio being such that shaft 165 makes two revolutions for one revolution of shaft 21. Secured to shaft 165 is a clutch element 166 and cooperating with this element is a clutching dog 167 pivoted upon a cam 168 which is freely mounted on the shaft. Also freely mounted on the shaft is a triple-armed member 169, one of whose arms engages a pin 170 in the free end of dog 167 to hold the latter out of engagement with the driving element 166. Each of the arms of member 169 is adapted to cooperate in turn with a stopping pawl 171 which is pivoted at 172. A magnet armature 173 has pin and slot connection 174 with the pawl 171 and upon energization of subtracting magnet 175 will rock the pawl 171 in a clockwise direction, as viewed in Fig. 8, to release member 169, thereby permitting spring 176 to rock the element in a counterclockwise direction through pin 170 and at the same time permitting the engagement of dog 167 with the driving element 166.

The cam 168 will thus be driven in a counterclockwise direction until the next arm of member 169 is engaged by pawl 171, which then causes disengagement of the clutch and interruption of further movement of the cam. The cam 168 is provided with three notches about its periphery into which a roller 177 rises successively. Upon the initial movement of cam 168 the higher, concentric portion of the cam will depress roller 177 and with it slider 178 upon which the roller is mounted. The lower extremity of slider 178 is provided with a notch into which the horizontal arm of a bell crank 179 is fitted. The bell crank has its depending arm lying adjacent to an edge of the clutch lever 151 so that the downward movement of slider 178 will cause the bell crank 179 to engage and move lever 151 in a declutching direction at a time determined by the time of energization of magnet 175 which is controlled by circuits extending through the sensing brushes.

*"Elusive one."*—The mechanism by means of which the "elusive one" is entered into the accumulator is illustrated in Fig. 9. The units order of the accumulator has associated therewith a magnet 180 whose armature is secured to the carry lever latch 181 of the units order so that energization of magnet 180 will trip the units pawl carrying arm 182 whereby, during the carrying portion of the machine cycle, the pawl 183 will advance the units wheel one step.

*Readout mechanism.*—For each order of the accumulator, there is a gear 184 (Fig. 8) driven from the gear 158 and displaced thereby in the same manner as index wheel 160. Since the ratio of gears 184 and 159 is 2:1, the former will turn through a half revolution for each revolution of the latter. Carried by and insulated from gear 184 is a pair of electrically connected brushes 185 mounted on one side of the gear and a second pair of electrically connected brushes 186 mounted on the opposite side of the gear. The two pairs of brushes are displaced with respect to one another eighteen degrees or a twentieth of a revolution. The angular displacement of gear 184 upon entry of a number, is accompanied by a corresponding angular displacement of brushes 185 and 186. Thus, if a 6 is entered into an order, both sets of brushes will be rotated six steps or six-twentieths of a revolution in a counterclockwise direction, as viewed in Fig. 8.

Cooperating with the brushes is a commutator device comprising contact segments 187 and a common arcuate conductor 188 between which brushes 186 form an electrical connection. There are ten segments 187 numbered 0, 1, 2 .... 9 and one of the brushes 186 will contact with the segment 187 representing the setting of the accumulator wheel while the other brush contacts with the conductor 19. The mechanical structure of this readout device is more fully set forth in Patent No. 2,007,375, granted to C. D. Lake et al. on July 9, 1935.

In Fig. 10, the readout structure is set forth diagrammatically and illustrates more clearly the relationship between the brushes and the contact segments. The brushes 185 cooperate with a similar set of contact segments similarly arranged and numbered. For the purposes of the present invention, however, only the segments in the 9 position are utilized and when the brush 185 is in contact with the 9 segment, it makes a connection with a segment 189. Brushes 185 are angularly displaced one step behind brushes 186 so that with brushes 186 set at zero, as in Fig. 10, brushes 185 will take a position, as shown, bridging the 9 segment 187 in line therewith and the special segment 189.

Problem

Figure 3:
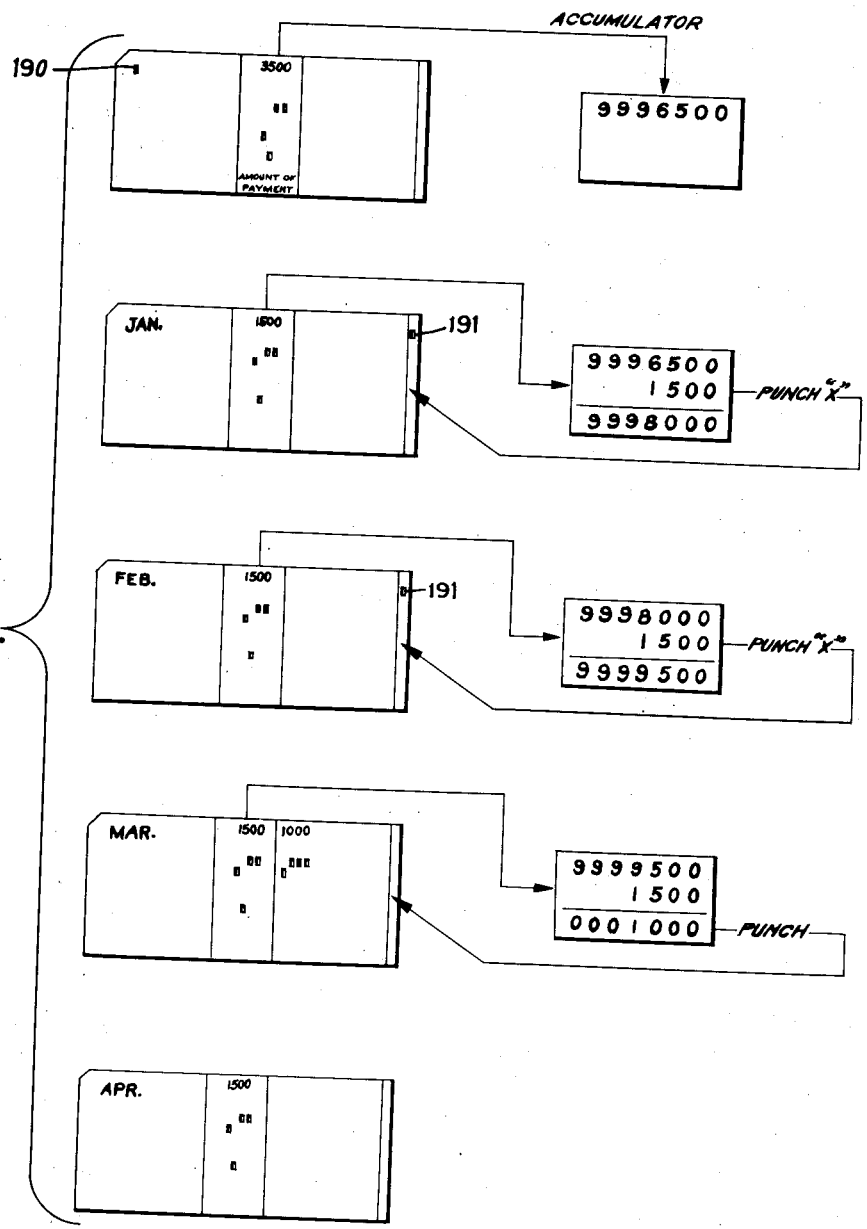
Fig. 3 is a diagram illustrating the problem which the machine is specially designed to handle.

Referring now to Fig. 3, a brief explanation will be given of a problem, after which the circuit diagram will be explained, at which time, the coordination of the various units will be set forth. In Fig. 3 are shown a number of cards which comprise a group. The first or uppermost card is a so-called "payment" card and has perforated therein the amount 3500, representing a payment or payments made on a loan. This card is distinguished by a perforation indicated at 190 in the "X" index point position of a selected column. The remaining cards are so-called "due" cards, there being one for each of a series of months and each indicating that for its month there is a payment of $1,500 due. The cards are fed through the machine and analyzed in succession. Upon analysis of the first card, the sensing of the "X" perforation 190 will cause the amount of payment, 3500, to be entered into the accumulator in the form of a complement and the amount represented on the accumulator will be 9996500 as indicated. Upon sensing of the second card, the due amount, 1500, is entered directly into the accumulator and when combined with the previously entered amount will leave a complementary value 9998000. This indicates that the due amount for Jan. is less than the full amount paid and that the amount due for Jan. is thus accounted for. The machine will, accordingly, post the Jan. card by making a perforation 191 in the "X" index point position of a selected column. Following this, the Feb. card is analyzed and its amount also entered into the accumulator, reducing the amount therein so that the accumulator contains the complement of 500 and again the perforation 191 is made in the Feb. card, indicating that the amount due for that month is accounted for.

At this point, there remains in the accumulator the value 500 represented as a complement. Upon sensing of the Mar. card, the 1500 is again entered directly. Since this entered amount is greater than the amount already standing therein, the accumulator will show the difference of 1000, which represents the amount due on the Mar. payment but not accounted for. The machine will automatically cause this difference to be punched in the Mar. card in some selected field and will suppress the punching of any further holes 191 in the Mar. or subsequent cards of that group. The remaining cards of that group will be sensed, but will pass through the machine without receiving any additional perforations.

Where the amount in the accumulator cancels out to zero after any entry, the "due" card, whose amount caused such zeroizing, will have punched therein the "X" hole 191 and a series of zeros will be punched in the field allotted to receive the unpaid balance. The machine senses the occurrence of a new group upon the sensing of the next "X" punched "payment" card which will automatically cause resetting of the accumulator in preparation to post the "due" cards of the next group.

Circuit diagram

The circuit diagram will now be described in the order in which the various operations occur. In the diagram, the various cam controlled contacts prefixed CC are constantly rotating and those prefixed FC operate only during the card feed cycles. Their timing is indicated in the timing diagram, Fig. 7, to which reference may be had for their time of opening and closing. Also on the circuit diagram are shown various relay magnets whose contacts have, in several cases, been located away from the coils to simplify the wiring connections. In order to readily identify the related parts, the contacts are given the same reference character as the coil followed by a numeral, and in addition the coils are shown in dotted position adjacent to the contacts which they control.

*Reset cycle.*—In order to ensure that the accumulator is cleared before operations are commenced, a preliminary reset cycle is manually initiated by depression of the reset key to close reset contacts 200 (Fig. 10a). This will complete a circuit from the DC side of the generator 12 (Fig. 10) to DC line 201, reset contacts 200 (Fig. 10a), cam contacts CC1, reset magnet 31, to left side of DC line 202. Energization of reset magnet 31 will cause clearing of the accumulator in the usual manner.

*Start circuits.*—With the cards placed in hopper 65 and the punch carriage in its left hand or last column punching position, which is a requisite to starting of the machine, the contacts P5 (Fig. 10a) will be closed, causing energization of the relay magnet F. If the start key is depressed at this time to close start key contacts 203, a circuit will be completed from line 201, through contacts FC4, 203, relay B, to line 202. Relay B will close its contacts B2, establishing a holding circuit for the relay through contacts FC4. Relay B will close its contacts B1 and a circuit will be traceable from line 201, through contacts P1, contacts B1, contacts F2, closed due to the energization of relay F, stop key contacts 204, contacts FC6, card feed clutch magnet 45, lower contacts D1, to line 202.

Energization of magnet 45 will cause the card feeding mechanism to make one operation during which the FC cams rotate once during two revolutions of the CC cams and, during this cycle, the lowermost card will be advanced to the first set of feed rollers and forwarded to a position where the leading edge of the card is under the sensing brushes 66. At this position, the so-called "X" brush 69 is in line with the "X" index point position of the first card. In moving to this position, the card has closed the card lever contacts 68, causing energization of relay magnet E whose contacts E4 provide a holding circuit through cam contacts FC2 which are timed to be closed during the interval between cards when the card lever contacts are open, so that, as long as the cards feed in succession, relay magnet E will remain energized. Since the first card is a "payment" card having a perforation 190, a circuit will be traced from line 201 to cam contacts FC5, the "X" brush 69, contacts E1, now closed, relay magnet J, to line 202. Contacts J1 establish a holding circuit through contacts FC3 and hold it through the sensing period of the next card feeding cycle.

It may be mentioned at this point that in the highest denominational order of the accumulator the brush 186 makes connection between the common strip 188 and a special segment 187a (Fig. 10a) when the brush stands in the zero position. When the machine is first started and the accumulator stands at zero, the brush 186 will make contact between strip 188 and the segment 187a permitting the completing of a circuit from line 201, upper contacts A3, contacts CC2, segment 187a, brush 186, strip 188, relay magnet C, to line 202. Relay C closes its contacts C2 to provide a holding circuit through contacts A3. Upon the subsequent closure of contacts FC10, relay magnet H will also be energized through contacts C2 and contacts H2 will provide a holding circuit.

At the completion of this card feed cycle, the feeding operation will stop due to opening of contacts B1. During the initial reset cycle, reset contacts 34 closed to energize relay magnet G whose contacts G1 set up a holding circuit through the lower feed rack contacts P2. Wired in parallel with relay magnet J is a multi-contact relay designated MC, which is energized therewith and which shifts the several contacts prefixed MC. Accordingly, at the end of the first card feed cycle, the relay magnets H, C, G, J, MC, E, and F are energized.

*Second feed cycle.*—The start key is now depressed a second time or, if the contacts 203 have been held closed, the second cycle will follow immediately. Relay magnet B is energized a second time and the feed clutch magnet 45 energized as before to advance the first card past the sensing brushes 66 and into position to be advanced by the right hand feed rack of the punching mechanism. During the feed cycle, contacts FC4 open to deenergize the relay B. As the first card passes the brushes 66 (see Fig. 10), the amount thereon will be entered into the accumulator in the form of a complement. This is effected as follows:

*Complement entering circuit.*—With the multi-contact relay MC energized, as explained, its contacts MC4 and MC5 (Fig. 10) will be closed and contacts MC6 opened. At the start of the cycle, cam contacts CC4 are closed, establishing a circuit from the A. C. side of the generator, through wire 205, contacts E3, now closed, cam contacts FC1, contacts CC4, all the contacts MC4 in parallel, to the adding magnets 155, and thence to ground. This energization of the magnets 155 will start the accumulator wheels rotating to enter nines. As they continue rotating, the first card is passing the brushes 66 and, upon sensing perforations, circuits will be completed from the A. C. side of the generator, through wire 205, contacts E3, FC1, impulse distributor ID, contact roll 54, brush 66, suitable plug connection 206, relay contacts MC5, subtracting magnet 175, to ground. Energization of magnet 175, as explained, will interrupt further rotation of the accumulating wheel and the amount standing therein will represent the nines complement of the amount entered in the corresponding card column. During the cycle, closure of cam contacts FC8 (see Fig. 10a) will energize the units carry lever 180 through the now closed contacts MC3 so that, during the carry portion of the accumulator operation, the "elusive one" will be entered into the units order, changing the entry to the tens complement of the number sensed.

Assuming that the group contained but a single "X" punched "payment" card, at the end of the second card feed cycle, then, the first "due" card would be about to pass the sensing brushes and the first "payment" card would be in the punching unit.

During this second card feed cycle, cam contacts FC9 (Fig. 10a) close to energize the relay magnet A, the circuit being traceable from line 201, contacts FC3, J1, FC9, relay A, to line 202. Contacts A4 hold this circuit through contacts FC7 throughout the remainder of the cycle. Relay A opens its contacts A3 to deenergize relays C and H. Also during the cycle, contacts FC3 open to drop relay J, contacts A2 open to prevent a reset operation, and contacts A1 (Fig. 10) open to prevent punching in the first card of the group.

*Punch feed circuits.*—Near the end of the second card feed cycle, the punch card lever contacts 73 close as the first card moves into the punching unit, this closure causing energization of relay magnet D, which closes its upper contacts D1. A circuit is thereafter established, when contacts CC3 close during the next following cycle, from left side of line 202, upper contacts D1, cam contacts CC3, the rack trip magnet 87, eject contacts P3, contacts F1, now closed, to line 201. Magnet 87 causes closure of contacts 91 (Fig. 10), resulting in the energization of the motor Z and as the magnet also trips the clutch, the right hand feed rack will advance the first card to punching position. As it advances, the right hand feed rack contacts P1 open and the left hand feed rack advances in the opposite direction to receive the card, causing opening of the last column contacts P5, with the consequent deenergization of relay magnet F.

It may here be mentioned that for the problem shown in Fig. 3 a skip bar is provided with a high portion which is arranged to automatically escape the card after it is under control of the left hand rack 74 to the first column in which punching is to be effected. Thus, for the first "payment" card entered into the punching unit, this high skip bar will advance the card to present the first column of the punching field to the row of punches 113.

*Automatic skipping.*—Since no punching is to be effected in the "payment" card, provision is made to automatically space the card by the punch receiving field into the eject position. This is brought about as follows: As explained above, while the carriage is advancing under control of the high portion of the skip bar, the escapement contacts 111 (Fig. 10a) are open. As soon as the first column to be punched arrives in position, the pawl 106 drops into the rack 74, permitting closure of the contacts 111. A circuit immediately establishes from line 201, contacts 111, relay contacts 13, the punch magnet 120. Energization of punch magnet 120 will cause escapement of the carriage one step and will also open contacts 111 momentarily. Such escapement will take place in the well known manner, that is, one of the interposer bars 114, specifically the one associated with the space key, does not have its left hand end cut away, so that this interposer is constantly in operating position between bar 118 and bail 129. Thus, magnet 120 upon energization will draw link 123 downwardly to rock bar 118 which through the special interposer will rock bail 129 and effect the spacing operation. This well-known arrangement is shown in Patent 2,097,145, granted October 26, 1937, to G. F. Daly et al. Upon their reclosure, the magnet is again energized to advance the rack another step and so on with each repeated energization advancing the rack another step.

After the field to be skipped has traversed the line of punches, the high portion of the skip bar again disengages the escapement pawl, permitting the carriage to move rapidly to the next position in which punching may be effected. When the right hand rack ultimately reached its left hand position, it shifted contacts P2, whereby the opening of the lower contacts P2 deenergized the relay magnet G and closure of upper contacts P2 completed a circuit through the relay magnet K whose contacts K1 thereupon set up a holding circuit for relay K through contacts FC4, magnet K thereupon closing its contacts K3. When the first card reaches the last column position, contacts P5 close, energizing relay magnet F, which closes its contacts F1, energizing the eject magnet 141. This causes the ejection of the first card to the hopper and closure of the eject contacts P3.

At the same time, a circuit is traceable from line 201, contacts FC4, contacts MC2, now closed, contacts K3 and E2, to relay magnet B. The consequent closure of contacts B1 will again establish the circuit through the card feed clutch magnet 45 and the second card of the group is advanced to pass the sensing brushes. For the problem under consideration, this second card is a "due" card and as it passes the brushes, the amount perforated therein will be entered as a true number into the accumulator.

*Adding circuit.*—The entering circuit in this case is traceable, for a representative column, from the AC side of the generator, through wire 205 (Fig. 10), contacts E3, FC1, and impulse distributor ID, contact roller 54, brush 66, plug connection 206, contacts MC6, adding magnet 155, and thence to ground. In this manner, the amount on the second card is entered into the accumulator direct. As in the case of the first card, it is again advanced to the punch and the high bar causes skipping to the first column of the field to be punched. During the feeding cycle, cam contacts FC7 open to drop out the holding circuit for relay magnet A so that, during the operation of the punching mechanism for the second card, magnet A is deenergized and its contacts A1 (Fig. 10) are closed.

*Posting circuit.*—As the card advances, the column selected to receive the posting designation arrives at the line of punches. In this position, a circuit is completed from line 201 (Fig. 10a) through escape contacts 111, relay contacts H1, a wire 207 (Fig. 10), conductor 132, brush 133, segment 131 in the selected position, plug connection 208, "X" punch selecting magnet 117, contacts C1, A1, relay magnet I, to line 202. The relay magnet I is a quick-acting relay magnet which immediately opens its contacts I3 (Fig. 10a) before punch magnet 120 is completely energized. Energization of the "X" magnet 117 advances its associated interposer and this closes the bail contact 127 (Fig. 10a) so that punch magnet 120, when now energized, will perforate the "X" position of the selected column and the card will escape from this position to be advanced by the high skip bar to the last column position, from which it is ejected, as explained. In this manner, each "due" card is in turn fed into the machine, its amount entered positively into the accumulator, and the selected column "X" punched or posted as the card passes through the punching unit. This operation continues until the amount of the accumulator changes from negative to positive, or, more specifically, until the highest order position of the accumulator stands at zero.

*Amount punching circuits.*—When this occurs, the circuit is completed upon closure of contacts CC2 through the zero segment 187a and brush 186 of the highest order to energize relay magnet C through the circuit traced above. This pickup of C occurs near the middle of the feeding of the card whose amount changed the setting of the accumulator from negative to positive and the machine will cause the punching of the amount standing in the accumulator on this card when the selected field reaches punching position. Energization of relay C shifts its contacts C1, thus connecting the 0–9 punch selecting magnets 117 to line 202 through upper contacts C1 and A1 and the relay I. When the first column of the field to be punched reaches the punching position, the circuit is completed from line 201 (Fig. 10a), contacts 111, contacts H1, wire 207 (Fig. 10), strip 132, brush 133, segment 131, plug connection 209, common strip 168, brush 186, segment 187, with which the brush is in contact, wire 210, corresponding selector magnet 117, upper contact C1, contact A1, relay I, to line 202 as before. Relay I again opens its contacts I3, placing completion of the punch magnet circuit under control of the bail contacts 127. In this manner, each successive column of the field is punched in accordance with the setting of the accumulator. When this card reaches the posting position, it will automatically escape past this position without effecting the posting or "X" punching as the contacts C1 in circuit therewith are now shifted and the card will be ejected in the familiar manner.

If the last entry exactly equalled the amount standing in the accumulator so that all the orders stand at zero, zeros will be punched in each column in the field in exactly the same manner as the true number is punched; however, in this case, the "X" punching will accompany the zero punching. This is brought about through the completion of an auxiliary shunt circuit through the segments 189 and the brushes 185 which, when all the brushes are at zero, will provide a path for the energization of the "X" magnet 117 which is traceable from wire 207 (Fig. 10), brush 133, segment 131, connection 208, "X" magnet 117, wire 211, units order segment 189, units order brush 185, segment 187, tens order brush 185, and tens order segment 189 to the hundreds order segment and brush 189 and 185, and so on through the remaining orders, to wire 212, thence through upper contacts A1, relay magnet I, to line 202. The energization of "X" magnet 117 will cause the posting designation to be made, as already explained.

With relay magnet C energized, the next following card will be advanced to pass the sensing brushes 66 and to be fed into the punching unit. During this feeding cycle, cam contacts FC10 close to energize the relay magnet H which opens its contacts HI and thereby prevents any further punching circuits to be completed for subsequently fed cards belonging to the same group. The circuit through relay H is maintained through upper contacts A3 which remain closed until the next "X" punched "payment" card is sensed, which indicates the arrival of a new group of cards.

When the first card of a new group arrives at the sensing position, the "X" perforation will be sensed by brush 69 while the last card of the preceding group is passing through the punching unit. Sensing of the "X" perforation will, as explained, energize magnet J. Closure of the upper contacts P2 will take place as the preceding card is advanced in the punch unit and thus causing energization of relay K. In this manner, contacts J2 and K2 (Fig. 10a) are closed while the last card of the preceding group passes through the punching unit. When this card arrives in the last column position, contacts P5 close, energizing relay F, which closes its contacts F1 and establishes the circuit to the reset magnet 31 of the accumulator. This circuit is traceable from line 201 to contacts F1, G2, K2, J2, A2, cam contacts CC1, reset magnet 31, to line 202, and the accumulator is consequently zeroized. As the accumulator resets, the cam 32 causes closure of reset contacts 33, establishing a circuit from line 201, contacts FC4, reset contacts 33, contacts K3, E2, the start relay magnet B, to line 202. Energization of magnet B, as explained above, will complete the circuit through the card feed clutch magnet 45 and the first card of the new group will be advanced to pass the brushes and the amount punched therein entered into the accumulator in the form of a complement.

The mechanism is not restricted to the presence of a single "payment" card for each group, but there may be several "X" punched cards, each representing a payment, and if the first card is followed by a second "payment" card, the "X" punching on the second card will be sensed by the brush 69 as the first card is passing through the punching unit and causes re-energization of the relay magnets J and MC so that, when this second card passes the brushes, its amount will also be entered into the accumulator in the form of a complement.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described controlled by record cards arranged in groups, means for feeding each card of a group of cards, in succession, the first card containing designations representing an amount and a special designation and each remaining card containing designations representing an amount, means for sensing the cards, an accumulator, entering means therefor arranged to enter amounts directly or in the form of complements, said entering means being normally arranged to enter amounts directly under control of said sensing means, means controlled in response to the sensing of the special designation on the first card for causing said entering means to enter the amount on the first card into said accumulator in the form of a complement, punching means, operating means therefor normally effective to cause said punching means to punch a special designation in each card after the card has been sensed, means controlled in response to the sensing of the special designation on the first card for rendering said operating means ineffective for the first card, means operative after each entering operation for ascertaining whether the accumulator contains a positive number or zero, and means controlled thereby when the accumulator contains a positive number or zero for rendering said punch operating means ineffective for the card whose amount when entered resulted in a positive number or zero in the accumulator and for all subsequent cards of the group.

2. The invention set forth in claim 1 in which further means is provided for ascertaining whether all orders of the accumulators contain zero, said means being connected to operate jointly with the means controlled by the first named ascertaining means to control said punching means to punch the special designation in the card, whose amount when entered, resulted in the presence of zeros in all orders of the accumulator.

3. The invention set forth in claim 1 in which the accumulator is provided with means settable by the accumulator to represent the amount standing therein, means controlled by said settable means, which means is normally ineffective to cause the operation of said punching means, and further means brought into operation by the means controlled by said ascertaining means for rendering the means controlled by said settable means effective to cause the operation of the punching means to punch the amount standing in the accumulator in the card, whose amount when entered resulted in a positive number or zero.

4. In a machine of the class described controlled by record cards arranged in groups, means for feeding each of a group of cards, in succession, said group comprising a plurality of leading cards, each containing designations representing an amount and a special designation and a plurality of detail cards containing designations representing amounts, means for sensing the cards, an accumulator, entering means therefor arranged to enter amounts directly or in the form of complements, said entering means being normally arranged to enter amounts directly under control of said sensing means, means controlled in response to the sensing of the special designation in each leading card for causing said entering means to enter the amounts on said leading cards into said accumulator in the form of a complement, designation effecting means for effecting a special designation on the cards, operating means therefor normally effective to cause said designation effecting means to effect a special designation in each card after the sensing thereof, means controlled by said accumulator and settable thereby to represent that it contains a positive number or zero, means for testing said settable means after each entry of an amount from a card, and means controlled by said testing means for suppressing the said operating means when the accumulator contains a positive number or zero.

5. In a machine of the class described controlled by record cards, sensing means, recording means, means for feeding a record card containing perforations representing an amount to said sensing and recording means in succession, an accumulator, entering means therefor for entering amounts directly or in the form of complements, means operative prior to the sensing of said card for causing said entering means to enter an amount in said accumulator in the form of a complement, means controlled by said sensing means for causing said entering means to enter the amount on said card into said accumulator, means operative after said amount on the card is entered for ascertaining whether the amount then contained in the accumulator is a positive number or zero, controlling connections between the accumulator and said recording means, means controlled by said ascertaining means when the accumulator contains a positive number or zero for rendering said controlling connections effective to cause said recording means to record on the card the amount standing in the accumulator, settable means controlled by said accumulator to indicate the presence of zeros in all orders of the accumulator, and means controlled thereby to cause said recording means to effect a special designation on said card when the amount on the accumulator is zero.

RUSSELL A. ROWLEY.